US012071041B2

(12) United States Patent
Ohtomo (10) Patent No.: US 12,071,041 B2
(45) Date of Patent: Aug. 27, 2024

(54) CHARGING SYSTEM AND VEHICLE

(71) Applicant: SUBARU CORPORATION, Tokyo (JP)

(72) Inventor: Yosuke Ohtomo, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 296 days.

(21) Appl. No.: 17/060,395

(22) Filed: Oct. 1, 2020

(65) Prior Publication Data
US 2021/0178931 A1    Jun. 17, 2021

(30) Foreign Application Priority Data

Dec. 12, 2019  (JP) .................................. 2019-224146

(51) Int. Cl.
| B60L 53/62 | (2019.01) |
| B60L 58/27 | (2019.01) |
| G01K 3/10 | (2006.01) |
| G01K 13/02 | (2021.01) |
| H01M 10/44 | (2006.01) |

(Continued)

(52) U.S. Cl.
CPC ............... B60L 58/27 (2019.02); B60L 53/62 (2019.02); G01K 3/10 (2013.01); G01K 13/02 (2013.01); H01M 10/44 (2013.01); H01M 10/46 (2013.01); H01M 10/615 (2015.04); H01M 10/625 (2015.04); H02J 7/007194 (2020.01); B60K 6/28 (2013.01); B60Y 2200/91 (2013.01);

(Continued)

(58) Field of Classification Search
CPC ... B60L 58/27; B60L 53/62; H02J 7/00; H02J 7/007194; H01M 10/625; H01M 10/615; H01M 10/46; H01M 10/44; G01K 13/02; G01K 3/10
USPC .......................................................... 320/109
See application file for complete search history.

(56) References Cited

U.S. PATENT DOCUMENTS

| 8,655,524 B2* | 2/2014 | Ichikawa ................ B60L 58/20 |
| | | 701/22 |
| 2011/0316486 A1* | 12/2011 | Inaba ................... H01M 10/625 |
| | | 320/150 |

(Continued)

FOREIGN PATENT DOCUMENTS

JP      2016-086550 A     5/2016

*Primary Examiner* — Drew A Dunn
*Assistant Examiner* — Pamela J Jeppson
(74) *Attorney, Agent, or Firm* — Rimon P.C.

(57) ABSTRACT

A charging system includes a charging controller and an estimated completion time deriver. The charging controller adjusts a temperature of an on-board battery with a heater so that the temperature of the battery is kept equal to or higher than a predetermined temperature. The battery is chargeable with electric power supplied from a power supply outside a vehicle. The charging controller charges the battery with charging power excluding temperature adjustment power consumed by the heater from permitted suppliable power supplied from the power supply to the vehicle. The estimated completion time deriver derives an estimated completion time based on an estimated value of the permitted suppliable power in a future and an estimated value of the temperature adjustment power that is derived based on an estimated value of an outside air temperature in the future. The estimated completion time is a time when charging is predicted to complete.

15 Claims, 6 Drawing Sheets

(51) Int. Cl.
  *H01M 10/46*     (2006.01)
  *H01M 10/615*    (2014.01)
  *H01M 10/625*    (2014.01)
  *H02J 7/00*      (2006.01)
  *B60K 6/28*      (2007.10)
(52) U.S. Cl.
  CPC ...... *B60Y 2200/92* (2013.01); *H01M 2220/20* (2013.01); *H02J 2310/48* (2020.01)

(56) References Cited

U.S. PATENT DOCUMENTS

2018/0080995 A1* 3/2018 Heinen .................. B60L 58/16
2020/0132774 A1* 4/2020 Hara .................... H02J 7/0048

* cited by examiner

CHARGING SYSTEM AND VEHICLE

CROSS-REFERENCE TO RELATED APPLICATIONS

The present application claims priority from Japanese Patent Application No. 2019-224146 filed on Dec. 12, 2019, the entire contents of which are hereby incorporated by reference.

BACKGROUND

The disclosure relates to a charging system capable of charging a battery of a vehicle with electric power supplied from an external power supply. The disclosure relates also to a vehicle.

In vehicles such as an electric vehicle and a plug-in hybrid vehicle, a battery mounted on the vehicle is chargeable via a charger coupled to an external power supply (for example, Japanese Unexamined Patent Application Publication No. 2016-86550).

SUMMARY

An aspect of the disclosure provides a charging system including a charging controller and an estimated completion time deriver. The charging controller is configured to adjust a temperature of an on-board battery with a heater so that the temperature of the battery is kept equal to or higher than a predetermined temperature. The battery is chargeable with electric power supplied from a power supply outside a vehicle. The charging controller is configured to charge the battery with charging power excluding temperature adjustment power from permitted suppliable power. The temperature adjustment power is electric power consumed by the heater. The permitted suppliable power is permitted electric power supplied from the power supply to the vehicle. The estimated completion time deriver is configured to derive an estimated completion time on a basis of an estimated value of the permitted suppliable power in a future and an estimated value of the temperature adjustment power that is derived on a basis of an estimated value of an outside air temperature in the future. The estimated completion time is a time when charging is predicted to complete.

An aspect of the disclosure provides a vehicle including a charging controller and an estimated completion time deriver. The charging controller is configured to adjust a temperature of a battery with a heater so that the temperature of the battery is kept equal to or higher than a predetermined temperature. The battery is chargeable with electric power supplied from a power supply outside the vehicle. The charging controller is configured to charge the battery with charging power excluding temperature adjustment power from permitted suppliable power. The temperature adjustment power is electric power consumed by the heater. The permitted suppliable power is permitted electric power supplied from the power supply. The estimated completion time deriver is configured to derive an estimated completion time on a basis of an estimated value of the permitted suppliable power in a future and an estimated value of the temperature adjustment power that is derived on a basis of an estimated value of an outside air temperature in the future. The estimated completion time is a time when charging is predicted to complete.

An aspect of the disclosure provides a charging system including circuitry. The circuitry is configured to adjust a temperature of an on-board battery with a heater so that the temperature of the battery is kept equal to or higher than a predetermined temperature. The battery is chargeable with electric power supplied from a power supply outside a vehicle. The circuitry is configured to charge the battery with charging power excluding temperature adjustment power from permitted suppliable power. The temperature adjustment power is electric power consumed by the heater. The permitted suppliable power is permitted electric power supplied from the power supply to the vehicle. The circuitry is configured to derive an estimated completion time on a basis of an estimated value of the permitted suppliable power in a future and an estimated value of the temperature adjustment power that is derived on a basis of an estimated value of an outside air temperature in the future. The estimated completion time is a time when charging is predicted to complete.

A fourth aspect of the disclosure provides a vehicle including circuitry. The circuitry is configured to adjust a temperature of a battery with a heater so that the temperature of the battery is kept equal to or higher than a predetermined temperature. The battery is chargeable with electric power supplied from a power supply outside the vehicle. The circuitry is configured to charge the battery with charging power excluding temperature adjustment power from permitted suppliable power. The temperature adjustment power is electric power consumed by the heater. The permitted suppliable power is permitted electric power supplied from the power supply. The circuitry is configured to derive an estimated completion time on a basis of an estimated value of the permitted suppliable power in a future and an estimated value of the temperature adjustment power that is derived on a basis of an estimated value of an outside air temperature in the future. The estimated completion time is a time when charging is predicted to complete.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

FIG. 2A to FIG. 2D are diagrams illustrating derivation of an estimated completion time, in which

FIG. 6A and FIG. 6B are diagrams illustrating an operation of an estimated completion time corrector, in which

DETAILED DESCRIPTION

Depending on an outside air temperature during charging, electric power is consumed to adjust the temperature of a battery of a vehicle and electric power for use in the charging fluctuates. Therefore, the accuracy of derivation of an estimated completion time is low. The estimated completion time is a time when the charging is predicted to complete.

It is desirable to provide a charging system and a vehicle in which the accuracy of derivation of an estimated charging completion time can be improved.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
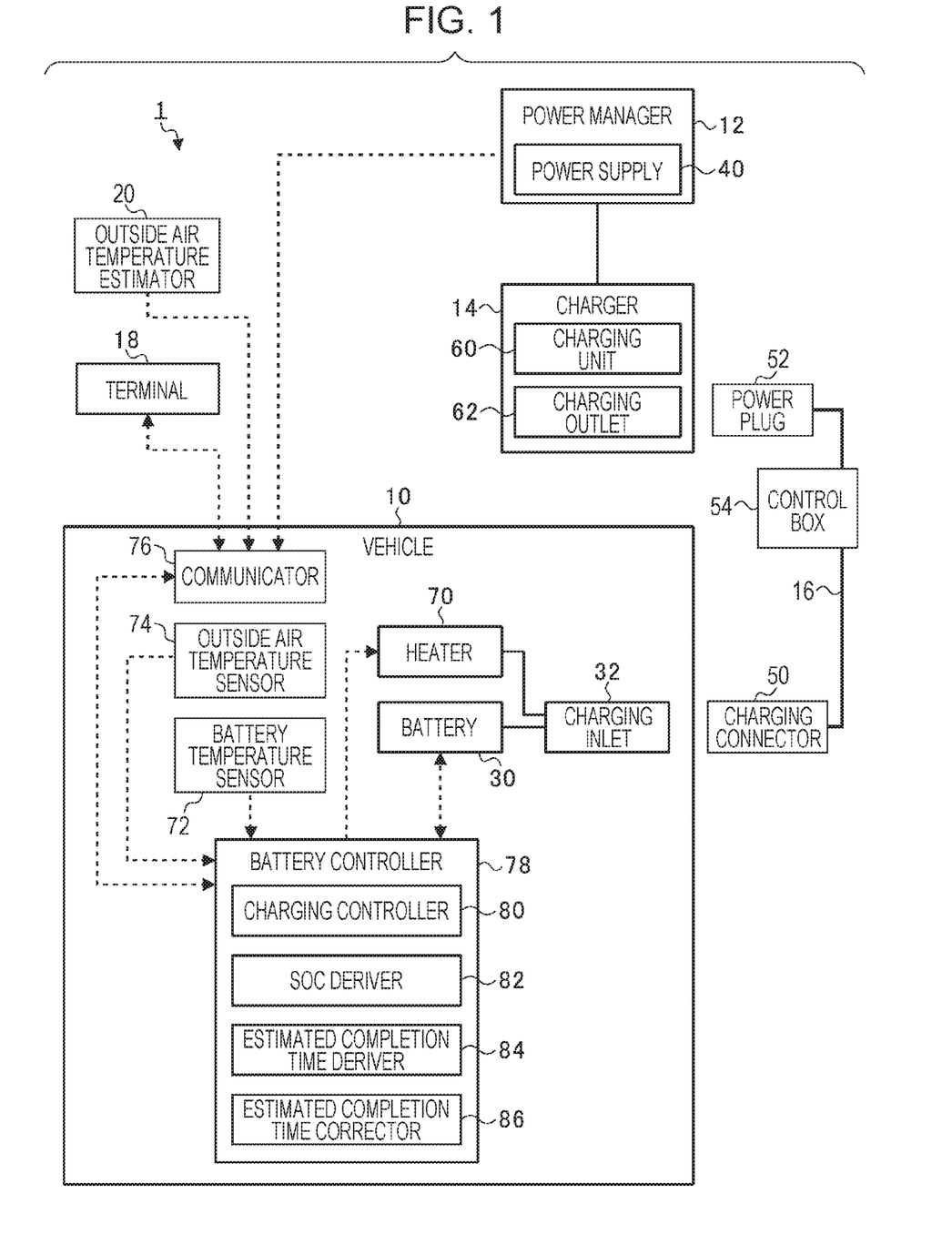
FIG. 1 is a schematic diagram illustrating the configuration of a charging system according to an embodiment of the disclosure.

FIG. 1 is a schematic diagram illustrating the configuration of a charging system 1 according to the embodiment. Components and processes relating to the embodiment are described below in detail and description is omitted for components and processes that do not relate to the embodiment.

The charging system 1 includes a vehicle 10, a power manager 12, a charger 14, a charging cable 16, a terminal 18, and an outside air temperature estimator 20. Examples of the vehicle 10 include an electric vehicle and a plug-in hybrid vehicle. The vehicle 10 includes a battery 30 that supplies electric power to a motor (not illustrated) serving as a drive source. The vehicle 10 has a charging inlet 32 coupled to the battery 30. For example, the charging inlet 32 is provided on the side of a body of the vehicle 10.

The power manager 12 includes a power supply 40 such as a power generation facility. Examples of the power manager 12 include an electric-power company. Examples of the power supply 40 include a power plant. The charger 14 is electrically coupled to the power supply 40 via, for example, a power grid (not illustrated) and an electric switchboard (not illustrated). The charger 14 can receive electric power supplied from the power supply 40.

A charging connector 50 is provided at one end of the charging cable 16. The charging connector 50 can be coupled to the charging inlet 32 of the vehicle 10. A power plug 52 is provided at the other end of the charging cable 16. The power plug 52 can be coupled to the charger 14. The charger 14 can supply electric power of the power supply 40 to the charging inlet 32 of the vehicle 10 through the charging cable 16. The battery 30 of the vehicle 10 is chargeable with the electric power supplied to the charging inlet 32 from the external power supply 40. The charging cable 16 has a control box 54. The control box 54 detects the occurrence of electric leakage, overcurrent, and overheat during charging and stops the charging when any one of those phenomena is detected.

Examples of the charger 14 include a household charger provided at a general house, and a service charger provided at a charging station. The charger 14 includes a charging unit 60 and a charging outlet 62. The charging unit 60 is coupled to the power grid. The charging outlet 62 is coupled to the charging unit 60. The power plug 52 of the charging cable 16 is coupled to the charging outlet 62. The charging unit 60 supplies electric power of the power supply 40 to the vehicle 10 through the charging outlet 62 and the charging cable 16.

Examples of the terminal 18 include a smartphone of an owner of the vehicle 10. The terminal 18 is communicable with the vehicle 10 and the charger 14 via either one of a cellular network and a wireless communication network such as a wireless LAN. Although detailed description is given later, the charging system 1 derives an estimated completion time when the charging of the battery 30 is predicted to complete. The charging system 1 reports the derived estimated completion time to the owner of the vehicle 10 via, for example, a display of the terminal 18.

The outside air temperature estimator 20 derives a temporal change in an estimated value of an outside air temperature in the future. Examples of the outside air temperature estimator 20 include a meteorological bureau. The estimated value of the outside air temperature may hereinafter be referred to as "estimated outside air temperature". The outside air temperature estimator 20 can transmit the temporal change in the estimated outside air temperature in the future via a communication network such as the Internet. The vehicle 10 can receive the temporal change in the estimated outside air temperature in the future from the outside air temperature estimator 20.

The power manager 12 derives a regional base profile showing a temporal change in typical power consumption in a predetermined region. The region is a region managed by the power manager 12, such as New York State, but is not limited to this example. The region is at least set to an area in the same time zone. For example, the power manager 12 derives a regional base profile of a region including a building having the charger 14.

The regional base profile shows a temporal change in power consumption on a 24-hour (1-day) basis. The regional base profile is derived based on a record of power consumption within a predetermined period such as one month. That is, the regional base profile roughly shows a temporal change in daily power consumption in a target region (for example, New York State) and a target period (for example, February).

For example, the power manager 12 derives regional base profiles of individual regions every month. The power manager 12 can transmit the regional base profiles of individual regions via a communication network such as the Internet. The vehicle 10 can receive the regional base profile (target regional base profile) of the region including the building having the charger 14. The target regional base profile corresponds to an estimated temporal change in power consumption in the building having the charger 14. The vehicle 10 may receive the regional base profile via the charger 14.

A predetermined contract amperage is set in the building having the charger 14. The contract amperage is an upper limit value of a current agreed in a contract between the power manager 12 and the building (demander). Electric power obtained by multiplying the contract amperage by a nominal value of a received voltage may hereinafter be referred to as "contract demand power". The contract demand power is an upper limit value of electric power consumable in the building.

In the building having the charger 14, electric power is also supplied to loads (for example, household appliances and other electric devices) other than the charger 14. Therefore, permitted electric power to be supplied from the charger 14 to the vehicle 10 corresponds to electric power obtained by subtracting power consumption of the loads other than the charger 14 in the building from the contract demand power. The permitted electric power to be supplied from the charger 14 to the vehicle 10 may hereinafter be referred to as "permitted suppliable power". For example, the permitted suppliable power is derived by subtracting power consumption in the target regional base profile from the contract demand power. That is, the charger 14 (charging unit 60) can supply such permitted suppliable power to the vehicle 10.

In addition to the battery 30 and the charging inlet 32, the vehicle 10 includes a heater 70, a battery temperature sensor 72, an outside air temperature sensor 74, a communicator 76, and a battery controller 78.

The heater 70 is coupled to the charging inlet 32. The heater 70 warms the battery 30 with electric power (electric power of the external power supply 40) supplied from the charger 14 to the charging inlet 32. The temperature of the battery 30 may hereinafter be referred to as "battery temperature". Adjustment of the battery temperature may be referred to as "temperature adjustment". The electric power consumed by the heater 70 may be referred to as "temperature adjustment power".

The battery temperature sensor 72 detects the battery temperature. The outside air temperature sensor 74 detects the outside air temperature. The communicator 76 is communicable with, for example, the terminal 18, the power manager 12, and the outside air temperature estimator 20.

The battery controller 78 is a semiconductor integrated circuit including a central processing unit (CPU), a ROM that stores programs and other data, and a RAM serving as a working area. The battery controller 78 executes the programs to function as a charging controller 80, an SOC deriver 82, an estimated completion time deriver 84, and an estimated completion time corrector 86. That is, the battery controller 78 is a computer that functions as the charging controller 80, the SOC deriver 82, the estimated completion time deriver 84, and the estimated completion time corrector 86 by cooperation between hardware and software.

The charging controller 80 controls the battery 30 and the heater 70. To charge the battery 30, the power plug 52 of the charging cable 16 is first coupled to the charging outlet 62 of the charger 14 and the charging connector 50 is coupled to the charging inlet 32 of the vehicle 10. When the vehicle 10 and the charger 14 receive operation for an instruction to start charging, a charging start instruction is transmitted to the battery controller 78. In response to the charging start instruction, the charging controller 80 starts to charge the battery 30.

The battery 30 is not appropriately charged unless the battery temperature is equal to or higher than a predetermined temperature. After the reception of the charging start instruction, the charging controller 80 adjusts the battery temperature by using the heater 70 so that the battery temperature is kept equal to or higher than the predetermined temperature. That is, the predetermined temperature corresponds to a charging permission temperature at which the charging of the battery 30 is permitted.

The charging controller 80 charges the battery 30 with electric power excluding the temperature adjustment power from the permitted suppliable power of the charger 14. The electric power for use in the charging of the battery 30 (electric power to be transferred to the battery 30) may hereinafter be referred to as "charging power".

When the battery temperature is lower than the predetermined temperature at the time of reception of the charging start instruction, the charging controller 80 performs temperature adjustment in such a manner that the permitted suppliable power to the charging inlet 32 is not transferred to the battery 30 but is transferred to the heater 70 alone until the battery temperature reaches the predetermined temperature. Such temperature adjustment may hereinafter be referred to as "initial temperature adjustment". After the initial temperature adjustment is finished, the charging controller 80 starts to transfer the permitted suppliable power to the battery 30 (charge the battery 30).

When the battery temperature is equal to or higher than the predetermined temperature at the time of reception of the charging start instruction, the charging controller 80 promptly starts to transfer the permitted suppliable power to the battery 30 without performing the initial temperature adjustment.

While the battery 30 is being actually charged (during charging), the battery temperature may decrease depending on the outside air temperature due to heat dissipation from the battery 30. In this case, the charging controller 80 charges the battery 30 while performing temperature adjustment by transferring part of the permitted suppliable power to the heater 70 so that the battery temperature is kept equal to or higher than the predetermined temperature. To distinguish this temperature adjustment from the initial temperature adjustment, the temperature adjustment during actual charging may hereinafter be referred to as "intermediate temperature adjustment" for convenience.

The SOC deriver 82 derives a state of charge (SOC) of the battery 30. The SOC is a level of charging of the battery 30 and is represented in units of percentage (100% indicates a fully charged state).

The estimated completion time deriver 84 derives an estimated completion time of the charging of the battery 30. The estimated completion time deriver 84 derives the estimated completion time when the supply of electric power from the power supply 40 to the vehicle 10 has become ready. For example, the estimated completion time deriver 84 derives the estimated completion time in response to reception of the charging start instruction.

The estimated completion time deriver 84 derives the estimated completion time based on an estimated value of the permitted suppliable power in the future and an estimated value of the temperature adjustment power in the future. The estimated completion time deriver 84 is described later in detail.

In response to an increase in the possibility that the charging completion time may deviate from the estimated completion time, the estimated completion time corrector 86 derives and reports an estimated completion time at a current time again. The estimated completion time corrector 86 is described later in detail.

Figure 2A:
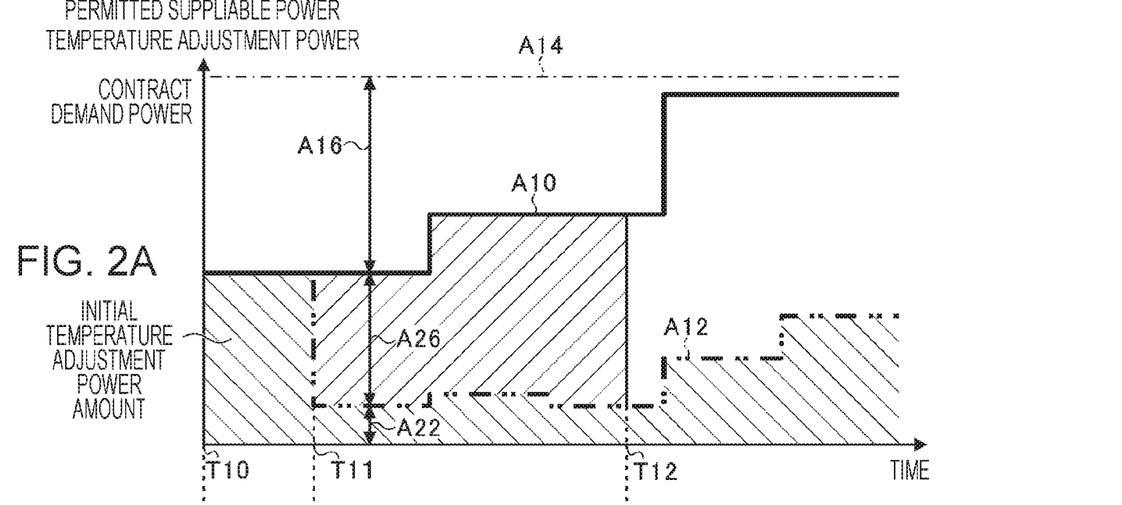
FIG. 2A illustrates a temporal change in an estimated value of permitted suppliable power and a temporal change in an estimated value of temperature adjustment power.
Figure 2B:
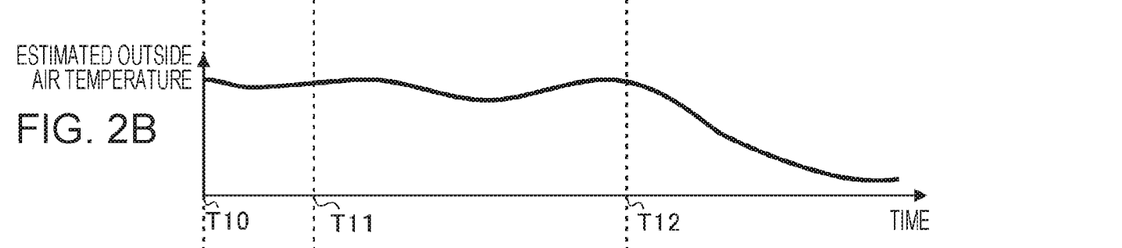
FIG. 2B illustrates a temporal change in an estimated outside air temperature.
Figure 2C:
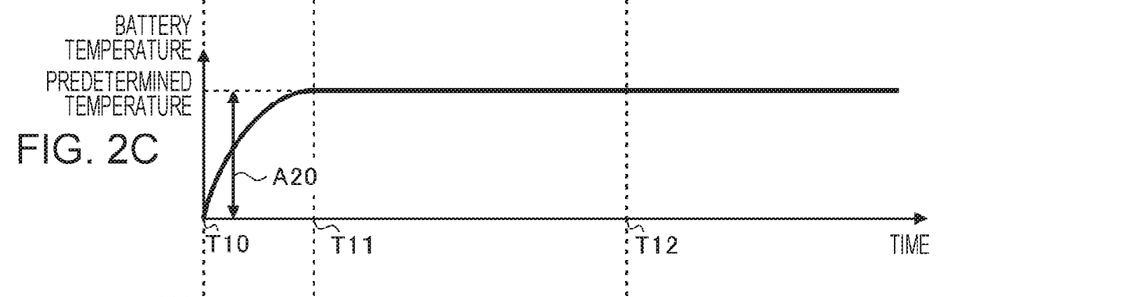
FIG. 2C illustrates a temporal change in an estimated value of a battery temperature.
Figure 2D:
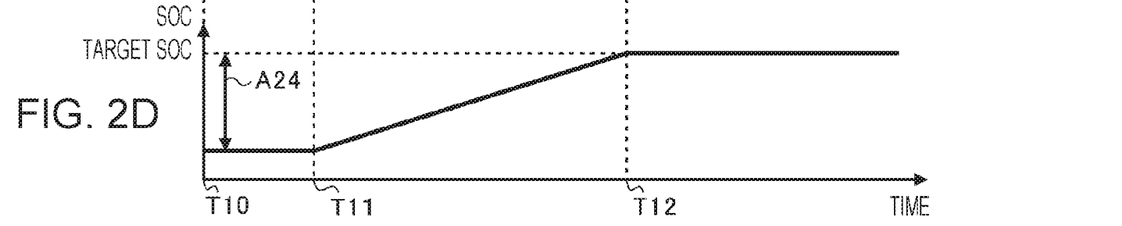
FIG. 2D illustrates a temporal change in an estimated value of an SOC.

FIG. 2A to FIG. 2D are diagrams illustrating the derivation of the estimated completion time. FIG. 2A illustrates a temporal change in the estimated value of the permitted suppliable power and a temporal change in the estimated value of the temperature adjustment power. FIG. 2B illustrates a temporal change in the estimated outside air temperature. FIG. 2C illustrates a temporal change in an estimated value of the battery temperature. FIG. 2D illustrates a temporal change in an estimated value of the SOC. In FIG. 2A to FIG. 2D, a time T10 is a current time when a charging start instruction is received. In FIG. 2A, a solid line A10 indicates the temporal change in the estimated value of the permitted suppliable power. A two-dot chain line A12 indicates the temporal change in the estimated value of the temperature adjustment power. A chain line A14 indicates the contract demand power. An arrow A16 indicates an example of power consumption in the regional base profile.

As illustrated in FIG. 2A, the estimated completion time deriver 84 acquires, from the power manager 12, a regional base profile corresponding to a temporal change in an estimated value of future power consumption of the loads other than the charger 14 in the building. The estimated completion time deriver 84 derives a temporal change in the estimated value of the permitted suppliable power in the future (solid line A10) by subtracting power consumption at each time in the regional base profile (arrow A16) from the contract demand power of the building having the charger 14 (chain line A14).

As illustrated in FIG. 2C, the battery temperature is lower than the predetermined temperature (charging permission temperature) at the current time when the charging start instruction is received (time T10). In this case, the initial temperature adjustment is performed as illustrated in FIG. 2A. The estimated completion time deriver 84 derives a power amount related to the initial temperature adjustment (initial temperature adjustment power amount). For example, the estimated completion time deriver 84 derives a battery temperature difference by subtracting a current battery temperature from the predetermined temperature as indicated by an arrow A20 in FIG. 2C. The estimated completion time deriver 84 derives the initial temperature adjustment power amount by multiplying the battery temperature difference by parameters of the battery 30 (specific heat, volume, and specific gravity of the battery 30) and by setting a unit.

The estimated completion time deriver 84 derives an estimated initial temperature adjustment completion time when the initial temperature adjustment is predicted to complete. For example, the estimated completion time deriver 84 sets the estimated initial temperature adjustment completion time to a time (for example, a time T11) when a power amount obtained by accumulating the estimated value of the permitted suppliable power from the current time T10 becomes larger than the initial temperature adjustment power amount. At the estimated initial temperature adjustment completion time, the battery temperature is predicted to become equal to or higher than the predetermined temperature.

As illustrated in FIG. 2B, the estimated completion time deriver 84 acquires a temporal change in the estimated outside air temperature in the future from the outside air temperature estimator 20. As illustrated in FIG. 2A, the estimated completion time deriver 84 derives a temporal change (two-dot chain line A12) in temperature adjustment power in the future after the initial temperature adjustment (that is, intermediate temperature adjustment power in the future) based on the temporal change in the estimated outside air temperature in the future in FIG. 2B. For example, the estimated completion time deriver 84 derives a heat dissipation temperature by subtracting the estimated outside air temperature from the predetermined temperature (charging permission temperature) at each time after the initial temperature adjustment. The heat dissipation temperature indicates a battery temperature that may decrease due to heat dissipation caused by the outside air temperature. The estimated completion time deriver 84 derives a power amount related to the intermediate temperature adjustment by multiplying the heat dissipation temperature at each time after the initial temperature adjustment by the parameters of the battery 30 (specific heat, volume, and specific gravity of the battery 30) and a predetermined heat insulation coefficient and by setting a unit. The estimated completion time deriver 84 converts the power amount into intermediate temperature adjustment power as indicated by an arrow A22 in FIG. 2A.

As illustrated in FIG. 2D, the estimated completion time deriver 84 acquires a current SOC from the SOC deriver 82. As indicated by an arrow A24 in FIG. 2D, the estimated completion time deriver 84 derives an expected charging amount by subtracting the current SOC from a target SOC. For example, the target SOC is set to 90% or higher. The expected charging amount indicates a lack of the power amount in the battery 30.

As illustrated in FIG. 2A, the estimated completion time deriver 84 derives an estimated value of the charging power indicated by an arrow A26 in FIG. 2A by subtracting the estimated value of the temperature adjustment power from the estimated value of the permitted suppliable power at each time after the initial temperature adjustment. The estimated completion time deriver 84 accumulates the derived estimated value of the charging power from the estimated initial temperature adjustment completion time (time T11) to the future. The power amount obtained by accumulating the estimated value of the charging power to the future may hereinafter be referred to as "cumulative power amount".

As illustrated in FIG. 2A and FIG. 2D, the estimated completion time deriver 84 sets an estimated completion time to a time when the cumulative power amount is larger than the expected charging amount (time T12).

FIG. 2A to FIG. 2D illustrate the case where the battery temperature is lower than the predetermined temperature at the current time T10 (the initial temperature adjustment is performed). When the battery temperature is equal to or higher than the predetermined temperature at the current time T10, the estimated completion time deriver 84 may skip the initial temperature adjustment. In this case, the estimated completion time deriver 84 may derive the estimated completion time (time T12) under the assumption that the estimated initial temperature adjustment completion time (time T11) is the current time in FIG. 2A to FIG. 2D.

Figure 3:
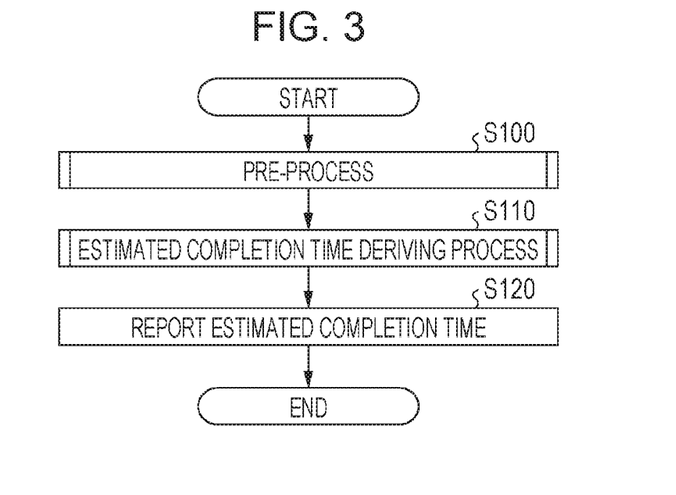
FIG. 3 is a flowchart illustrating a flow of an operation of an estimated completion time deriver.

FIG. 3 is a flowchart illustrating a flow of the operation of the estimated completion time deriver 84. The estimated completion time deriver 84 performs a series of processes in FIG. 3 when the supply of electric power from the power supply 40 to the vehicle 10 has become ready. For example, the estimated completion time deriver 84 performs the series of processes in FIG. 3 in response to reception of a charging start instruction.

The estimated completion time deriver 84 first performs a pre-process prior to deriving an estimated completion time (S100). In the pre-process, various pieces of information are acquired for the derivation of the estimated completion time. A flow of the pre-process is described later in detail.

Next, the estimated completion time deriver 84 performs an estimated completion time deriving process for deriving the estimated completion time by using various pieces of information acquired in the pre-process (S110). A flow of the estimated completion time deriving process is described later in detail.

Next, the estimated completion time deriver 84 transmits the estimated completion time derived in the estimated completion time deriving process to the terminal 18 to report the estimated completion time to the owner of the vehicle 10 (S120). Then, the estimated completion time deriver 84 terminates the series of processes.

Figure 4:
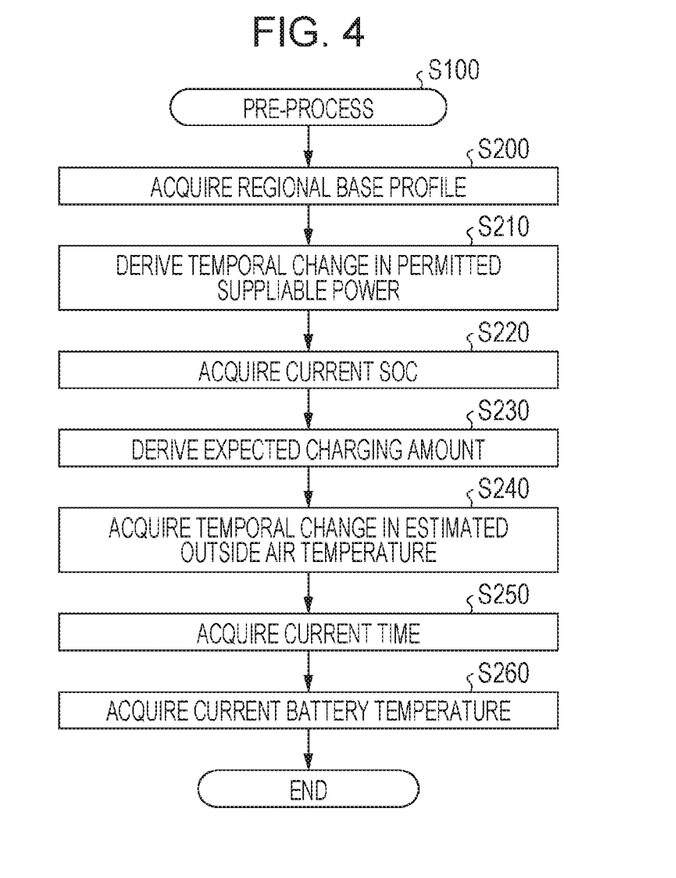
FIG. 4 is a flowchart illustrating a flow of a pre-process.

FIG. 4 is a flowchart illustrating the flow of the pre-process (S100). The estimated completion time deriver 84 first acquires a regional base profile from the power manager 12 (S200). Next, the estimated completion time deriver 84 derives a temporal change in the estimated value of the permitted suppliable power based on the regional base profile (S210). For example, the estimated completion time deriver 84 acquires the contract demand power from the charger 14. The estimated completion time deriver 84 derives the temporal change in the estimated value of the permitted suppliable power by subtracting power consumption in the regional base profile from the contract demand power.

Next, the estimated completion time deriver 84 acquires a current SOC derived by the SOC deriver 82 (S220). Next, the estimated completion time deriver 84 derives an expected charging amount by subtracting the current SOC from a target SOC (for example, 90%) (S230).

Next, the estimated completion time deriver 84 acquires a temporal change in the estimated outside air temperature from the outside air temperature estimator 20 (S240). Next, the estimated completion time deriver 84 acquires a current time (S250). Next, the estimated completion time deriver 84 acquires a current battery temperature from the battery temperature sensor 72 (S260) and terminates the series of processes.

Figure 5:
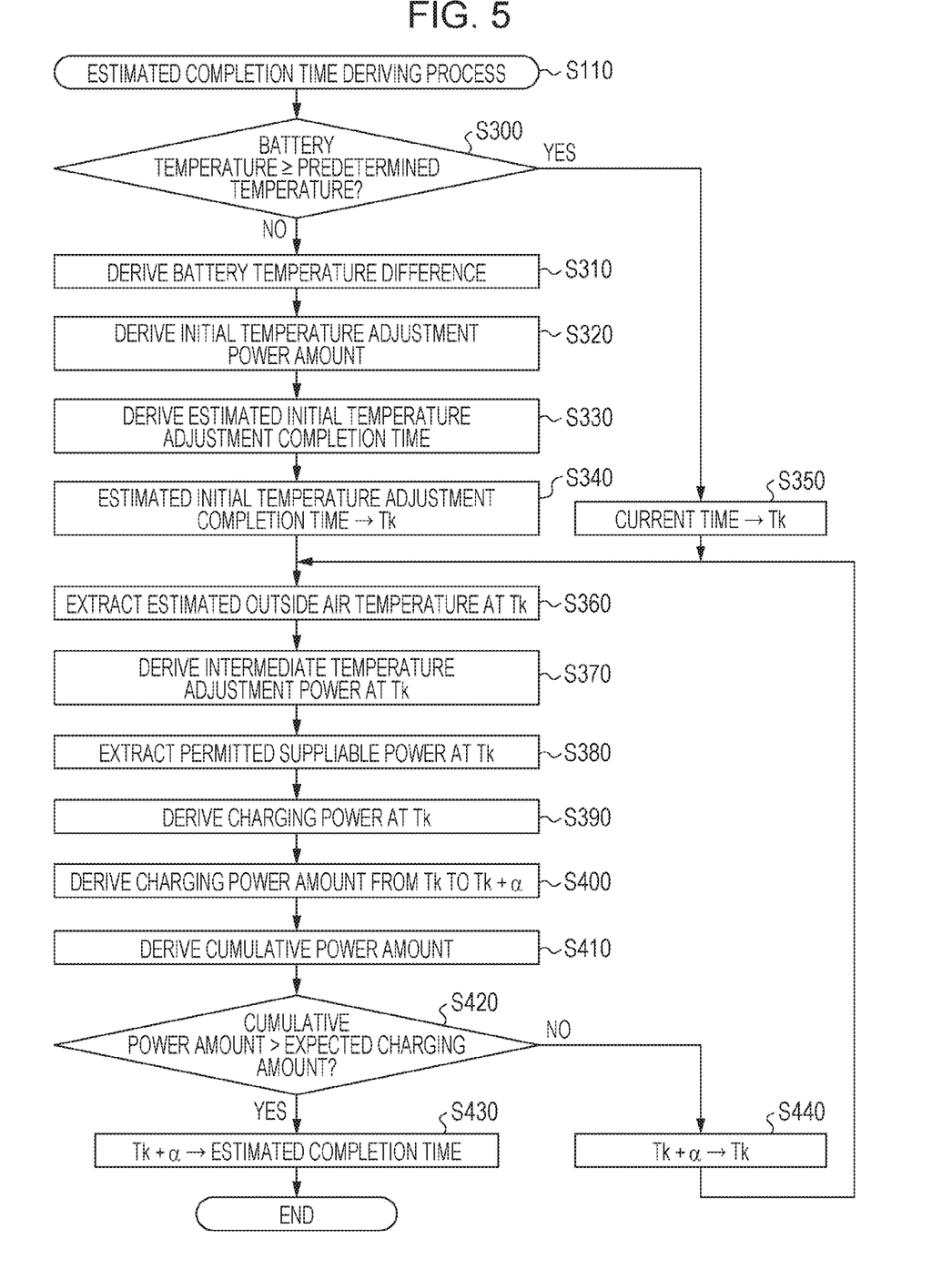
FIG. 5 is a flowchart illustrating a flow of an estimated completion time deriving process.

FIG. 5 is a flowchart illustrating the flow of the estimated completion time deriving process (S110). The estimated completion time deriver 84 first determines whether the current battery temperature is equal to or higher than the predetermined temperature (charging permission temperature) (S300).

When the current battery temperature is lower than the predetermined temperature (NO in S300), the estimated completion time deriver 84 derives a battery temperature difference by subtracting the current battery temperature from the predetermined temperature (S310). Next, the estimated completion time deriver 84 derives an initial temperature adjustment power amount based on the battery temperature difference (S320). Next, the estimated completion time deriver 84 derives an estimated initial temperature adjustment completion time based on the initial temperature adjustment power amount (S330). Next, the estimated completion time deriver 84 assumes the estimated initial temperature adjustment completion time as a time Tk (S340) and proceeds to a process of Step S360.

When the current battery temperature is equal to or higher than the predetermined temperature (YES in S300), the estimated completion time deriver 84 assumes the current time as the time Tk (S350) and proceeds to the process of Step S360.

In Step S360, the estimated completion time deriver 84 extracts an estimated outside air temperature at the time Tk from the temporal change in the estimated outside air temperature (S360). Next, the estimated completion time deriver 84 derives an estimated value of the intermediate temperature adjustment power at the time Tk based on the estimated outside air temperature at the time Tk (S370).

Next, the estimated completion time deriver 84 extracts an estimated value of the permitted suppliable power at the time Tk from the temporal change in the estimated value of the permitted suppliable power (S380).

Next, the estimated completion time deriver 84 derives an estimated value of the charging power at the time Tk by subtracting the estimated value of the intermediate temperature adjustment power at the time Tk from the estimated value of the permitted suppliable power at the time Tk (S390).

Next, the estimated completion time deriver 84 derives a charging power amount from the time Tk to a time Tk+α (S400). For example, α is 1 minute but is not limited to this example. That is, the estimated completion time deriver 84 derives a charging power amount within a predetermined period (1 minute) from the time Tk.

Next, the estimated completion time deriver 84 derives a cumulative power amount based on the charging power amount in Step S400 (S410). For example, the estimated completion time deriver 84 obtains a cumulative power amount at the current time by adding the charging power amount within the predetermined period in Step S400 to a previous cumulative power amount derived in Step S410. When the process of Step S410 is performed for the first time, the estimated completion time deriver 84 sets the charging power amount within the predetermined period in Step S400 as the cumulative power amount at the current time.

Next, the estimated completion time deriver 84 determines whether the cumulative power amount derived in Step S410 is larger than the expected charging amount (S420). When the cumulative power amount is larger than the expected charging amount (YES in S420), the estimated completion time deriver 84 sets the time Tk+α as the estimated completion time (S430) and terminates the series of processes.

When the cumulative power amount is not larger than the expected charging amount (NO in S420), the estimated completion time deriver 84 sets the time Tk+α as the time Tk (S440) and repeats the process of Step S360 and the subsequent processes. That is, the estimated completion time deriver 84 accumulates the charging power to the future until the cumulative power amount becomes larger than the expected charging amount, and sets the estimated completion time to a time when the cumulative power amount is larger than the expected charging amount.

Figure 6A:
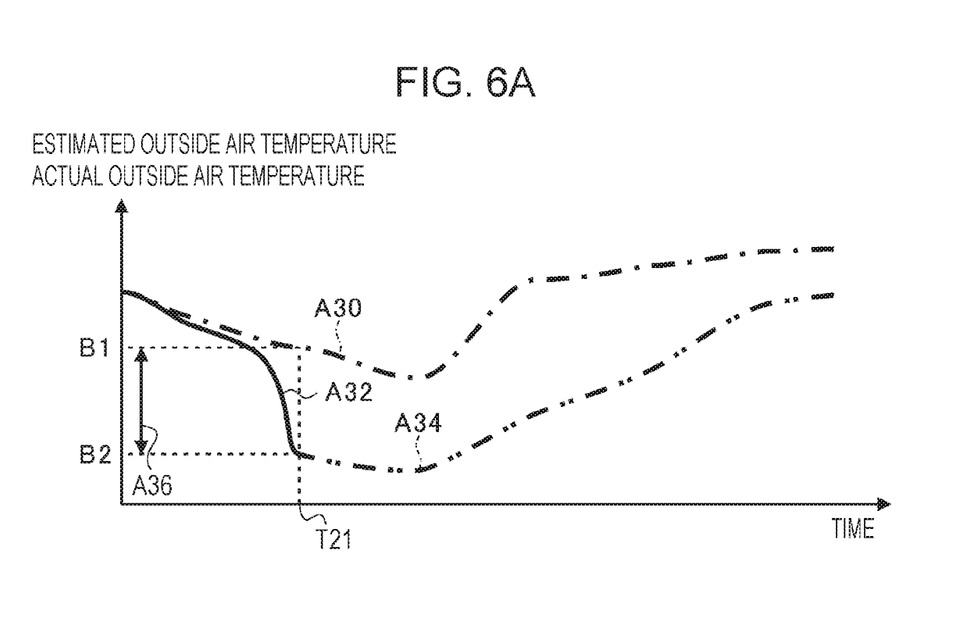
FIG. 6A illustrates an example of a temporal change in the estimated outside air temperature and a temporal change in an actual value of an outside air temperature (actual outside air temperature)
Figure 6B:
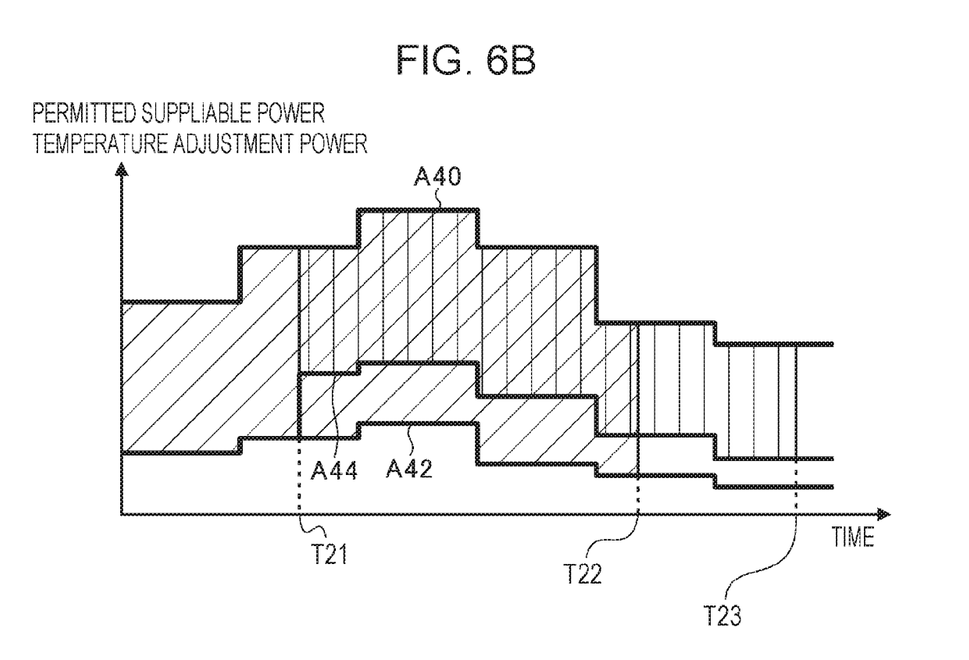
FIG. 6B illustrates an example of a temporal change in the estimated value of the permitted suppliable power and a temporal change in the estimated value of the temperature adjustment power.

FIG. 6A and FIG. 6B are diagrams illustrating an operation of the estimated completion time corrector 86. FIG. 6A illustrates an example of a temporal change in the estimated outside air temperature and a temporal change in an actual value of the outside air temperature (actual outside air temperature). FIG. 6B illustrates an example of a temporal change in the estimated value of the permitted suppliable power and a temporal change in the estimated value of the temperature adjustment power. In FIG. 6A and FIG. 6B, a time T21 during charging is a current time. In FIG. 6A, a chain line A30 indicates a temporal change in the estimated outside air temperature that has been used for the derivation of the estimated completion time in response to the reception of the charging start instruction. A solid line A32 indicates the temporal change in the actual value of the outside air temperature. A two-dot chain line A34 indicates a temporal change in the estimated outside air temperature that is acquired at the current time T21. In FIG. 6B, a solid line A40 indicates the temporal change in the estimated value of the permitted suppliable power. A solid line A42 indicates a temporal change in the estimated value of the temperature adjustment power that has been used for the derivation of the estimated completion time in response to the reception of the charging start instruction. A solid line A44 indicates a temporal change in the estimated value of the temperature adjustment power that is derived at the current time T21. The time when the estimated completion time is derived in response to the reception of the charging start instruction may hereinafter be referred to as "originally".

As illustrated in FIG. 6A, the actual outside air temperature (solid line A32) may deviate from the temporal change in the originally estimated outside air temperature (chain line A30) along with an elapse of time. In the example of FIG. 6A, a current outside air temperature (outside air temperature B2) is lower than an estimated outside air temperature (outside air temperature B1) at the current time T21 within the temporal change in the originally estimated outside air temperature. When the actual outside air temperature deviates from the originally estimated outside air temperature, the charging completion time may deviate from the originally estimated completion time.

The estimated completion time corrector 86 acquires an actual value of the current outside air temperature from the outside air temperature sensor 74. As indicated by an arrow A36 in FIG. 6A, the estimated completion time corrector 86 derives, as an outside air temperature difference, an absolute value of a difference between the actual value of the current outside air temperature and an estimated outside air temperature at the current time within the temporal change in the estimated outside air temperature that has been used for the derivation of the estimated completion time.

When the outside air temperature difference is equal to or larger than a predetermined value, the estimated completion time corrector 86 acquires a temporal change (two-dot chain line A34) in a future outside air temperature estimated at the current time. As indicated by the solid line A44 in FIG. 6B, the estimated completion time corrector 86 derives again a temporal change in the estimated value of the temperature adjustment power based on the temporal change in the future outside air temperature estimated at the current time.

In FIG. 6B, the cumulative power amount of the charging power based on the temporal change in the originally estimated value of the temperature adjustment power is hatched obliquely. In FIG. 6B, the originally estimated completion time is a time T22.

As indicated by vertical hatching in FIG. 6B, the estimated completion time corrector 86 derives a cumulative power amount of the charging power based on the temporal change in the estimated value of the temperature adjustment power at the current time (time T21). Further, the estimated completion time corrector 86 derives a current expected charging amount based on a current SOC. The estimated completion time corrector 86 derives, as an estimated completion time at the current time, a time when the cumulative power amount is larger than the current expected charging amount (time T23). The estimated completion time corrector 86 reports the derived estimated completion time again. For example, the estimated completion time corrector 86 reports the estimated completion time at the current time to the owner of the vehicle 10 again by displaying the estimated completion time on the display of the terminal 18.

After the estimated completion time is reported again during the charging, the estimated completion time corrector 86 derives an outside air temperature difference based on the temporal change in the estimated outside air temperature at the time of derivation of the estimated completion time reported again. When the outside air temperature difference is equal to or larger than the predetermined value, the estimated completion time corrector 86 derives and reports the estimated completion time again. That is, until the charging is completed, the estimated completion time corrector 86 repeats the determination as to whether the outside air temperature difference is equal to or larger than the predetermined value.

Figure 7:
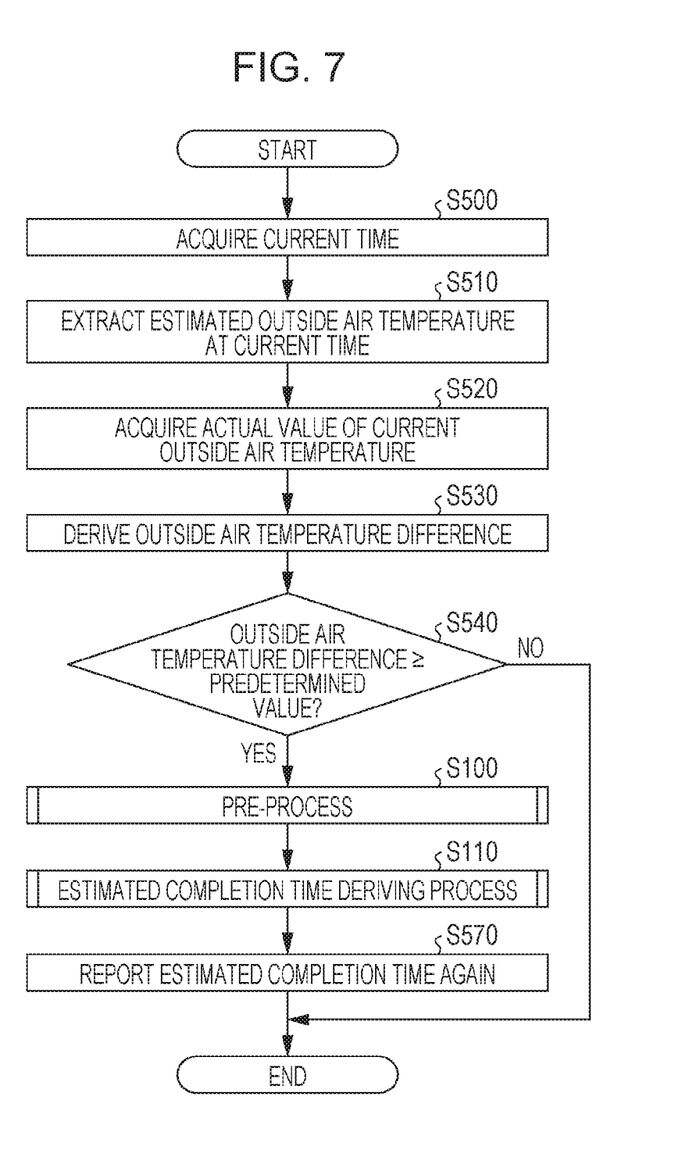
FIG. 7 is a flowchart illustrating a flow of the operation of the estimated completion time corrector.

FIG. 7 is a flowchart illustrating a flow of the operation of the estimated completion time corrector 86. After the estimated completion time is reported (S120) (in other words, after the series of processes in FIG. 3 is terminated), the estimated completion time corrector 86 repeats a series of processes in FIG. 7 by interrupt control of every predetermined control period. For example, the predetermined control period is 1 minute but is not limited to this example.

The estimated completion time corrector 86 first acquires a current time (S500). Next, the estimated completion time corrector 86 extracts an estimated outside air temperature at the current time based on the temporal change in the estimated outside air temperature that has been used for the derivation of the estimated completion time (S510).

Next, the estimated completion time corrector 86 acquires an actual value of a current outside air temperature from the outside air temperature sensor 74 (S520). Next, the estimated completion time corrector 86 derives, as the outside air temperature difference, an absolute value of a difference between the estimated outside air temperature at the current time and the actual value of the current outside air temperature (S530).

Next, the estimated completion time corrector 86 determines whether the outside air temperature difference is equal to or larger than the predetermined value (S540). When the outside air temperature difference is smaller than the predetermined value (NO in S540), the estimated completion time corrector 86 terminates the series of processes.

When the outside air temperature difference is equal to or larger than the predetermined value (YES in S540), the estimated completion time corrector 86 performs a process similar to the pre-process in FIG. 4 (S100). Next, the estimated completion time corrector 86 performs a process similar to the estimated completion time deriving process in FIG. 5 (S110). Thus, an estimated completion time at the current time is derived based on the estimated outside air temperature derived at the current time.

Next, the estimated completion time corrector 86 transmits the derived estimated completion time to the terminal 18 to report the estimated completion time to the owner of the vehicle 10 again (S570). That is, when the outside air temperature difference is equal to or larger than the predetermined value, there is a strong possibility that the estimated completion time may deviate from the already reported estimated completion time. Therefore, the estimated completion time corrector 86 derives and reports the estimated completion time at the current time again.

As described above, in the charging system 1 of the embodiment, the estimated completion time deriver 84 of the vehicle 10 derives the estimated completion time based on the estimated value of the permitted suppliable power in the future and the estimated value of the temperature adjustment power that is derived based on the estimated value of the outside air temperature in the future. For example, the estimated completion time deriver 84 sets the estimated completion time to the time when the cumulative power amount is larger than the expected charging amount. The cumulative power amount is obtained by accumulating the estimated value of the charging power to the future. The estimated value of the charging power is obtained by subtracting the estimated value of the temperature adjustment power from the estimated value of the permitted suppliable power.

According to the charging system 1 of the embodiment, the estimated value of the temperature adjustment power in the future and the estimated value of the charging power in the future can be derived accurately. Thus, the accuracy of the derivation of the estimated charging completion time can be improved.

The estimated completion time deriver 84 of the charging system 1 of the embodiment derives the estimated completion time and reports the derived estimated completion time when the supply of electric power from the power supply 40 to the vehicle 10 has become ready. In the charging system 1 of the embodiment, the owner of the vehicle 10 can recognize the estimated completion time at the time of operation for an instruction to start charging.

When the absolute value of the difference between the actual value of the current outside air temperature and the estimated value of the outside air temperature at the current time within the temporal change in the estimated value of the outside air temperature that has been used for the derivation of the estimated completion time is equal to or larger than the predetermined value, the estimated completion time corrector 86 of the charging system 1 of the embodiment derives the estimated completion time at the current time again and reports the derived estimated completion time. In the charging system 1 of the embodiment, when the outside air temperature deviates from the estimated value, the owner of the vehicle 10 can recognize that the estimated completion time has been changed. Further, the owner can recognize a more accurate estimated completion time.

Although the embodiment of the disclosure has been described above with reference to the accompanying drawings, the embodiment of the disclosure is not limited to the embodiment described above. It is understood that a person having ordinary skill in the art may conceive various modifications or revisions within the scope of claims and those modifications or revisions also belong to the technical scope of the embodiment of the disclosure.

In the embodiment described above, the battery controller 78 in the vehicle 10 functions as the estimated completion time deriver 84 and the estimated completion time corrector 86. The computer that functions as the estimated completion time deriver 84 and the estimated completion time corrector 86 may be provided in either one of the charger 14 and the control box 54 of the charging cable 16. In this case, the estimated completion time deriver 84 and the estimated completion time corrector 86 may execute the processes by acquiring various pieces of information such as the battery temperature, the actual value of the outside air temperature, and the current SOC from the vehicle 10 through communication.

In the embodiment described above, the temporal change in the estimated outside air temperature is acquired from the outside air temperature estimator 20. The temporal change in the estimated outside air temperature may be acquired from, for example, a different weather forecasting organization instead of being acquired from the outside air temperature estimator 20.

In the embodiment described above, the estimated completion time is reported to the terminal 18 such as a smartphone. The estimated completion time may be reported to, for example, a television set in a house instead of being reported to the terminal 18.

In the charger 14 of the embodiment described above, the power plug 52 of the charging cable 16 is coupled to the charging outlet 62. The charger 14 may include the charging cable 16.

The battery controller 78 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the battery controller 78 including the charging controller 80, the SOC deriver 82, the estimated completion time deriver 84, and the estimated completion time corrector 86. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A charging system comprising:
   a charging controller configured to:
      control a heater to maintain a temperature of an on-board battery to be equal to or higher than a predetermined temperature, the heater being supplied with temperature adjustment power out of electric power supplied from a charger located outside a vehicle, the charger being located in a building; and
      charge the on-board battery with charging power excluding the temperature adjustment power from the electric power supplied from the charger to the vehicle;
   an estimated completion time deriver configured to:
      acquire a first weather forecast at a first time;
      in response to acquiring the first weather forecast, predict a first outside air temperature profile, the first outside air temperature profile indicating a temporal change in an outside air temperature after the first time based on the first weather forecast;
      estimate a first temperature adjustment power profile based on the first outside air temperature profile, the first temperature adjustment power profile indicating a temporal change in the temperature adjustment power after the first time;
      estimate a suppliable power profile, the suppliable power profile indicating a temporal change in a maximum supply power of the charger after the first time; and
      estimate a first charging completion time based on the first temperature adjustment power profile and the suppliable power profile, the first charging completion time being a time at which a value obtained by subtracting a time integral of the first temperature adjustment power profile after the first time from a time integral of the suppliable power profile after the first time from a time integral of the suppliable power profile after the first time is greater than a first threshold, the first threshold being equal to a power amount required to raise a state of charge of the on-board battery to a predetermined value;
   an outside air temperature sensor configured to detect the outside air temperature; and an estimated completion time corrector configured to, when an absolute value of a difference between an actual outside air temperature at a second time after the first time detected by the outside air temperature sensor and a predicted outside air temperature at the second time predicted by the first weather forecast is equal to or larger than a predetermined value, i) acquire a second weather forecast, ii) predict a second outside air temperature profile indicating a temporal change in the outside air temperature after the second time based on the second weather forecast, iii) estimate a second temperature adjustment power profile indicating a temporal change in the temperature adjustment power after the second time based on the second outside air temperature profile, and iv) estimate a second charging completion time based on the second temperature adjustment power profile and the estimated suppliable power profile, the second charging completion time being a time at which a value obtained by subtracting a time integral of the second temperature adjustment power profile after the second time from a time integral of the suppliable power profile after the second time is greater than a second threshold, the second threshold being equal to the power amount required to raise the state of charge of the on-board battery to the predetermined value, wherein the predetermined value is larger than zero, and wherein the estimated completion time deriver is configured to estimate the suppliable power profile based on a base profile and an upper limit value of electric power consumable in the building, the base profile indicating a predicted temporal change in a power consumption of loads other than the charger located in the building.

2. The charging system according to claim 1, wherein the estimated completion time deriver starts estimating the first charging completion time and reports the estimated first charging completion time when supply of the electric power from the charger to the vehicle becomes ready, and wherein the estimated completion time corrector reports the second charging completion time when the estimated completion time corrector estimates the second charging completion time.

3. The charging system according to claim 1, wherein the base profile includes information corresponding to a temporal change in typical power consumption on a 24-hour basis in a region and in a month, the region including the building, the month including the first time.

4. The charging system according to claim 3, wherein the base profile is determined by an electric-power company providing electricity to the building.

5. The charging system according to claim 4, wherein the estimated completion time corrector is configured to receive the base profile via the charger.

6. A vehicle comprising:
a charging controller configured to:
control a heater to maintain a temperature of a battery to be equal to or higher than a predetermined temperature, the heater being supplied with temperature adjustment power out of electric power supplied from a charger outside the vehicle, the charger being located in a building; and
charge the battery with charging power excluding the temperature adjustment power from the electric power supplied from the charger;
an estimated completion time deriver configured to:
acquire a first weather forecast at a first time;
in response to acquiring the first weather forecast, predict a first outside air temperature profile, the first outside air temperature profile indicating a temporal change in an outside air temperature after the first time based on the first weather forecast;
estimate a first temperature adjustment power profile based on the first outside air temperature profile, the first temperature adjustment power profile indicating a temporal change in the temperature adjustment power after the first time;
estimate a suppliable power profile, the suppliable power profile indicating a temporal change in a maximum supply power of the charger after the first time; and
estimate a first charging completion time based on the first temperature adjustment power profile and the suppliable power profile, the first charging completion time being a time at which a value obtained by subtracting a time integral of the first temperature adjustment power profile after the first time from a time integral of the suppliable power profile after the first time is greater than a first threshold, the first threshold being equal to a power amount required to raise a state of charge of an on-board battery to a predetermined value;
an outside air temperature sensor configured to detect the outside air temperature; and
an estimated completion time corrector configured to, when an absolute value of a difference between an actual outside air temperature at a second time after the first time detected by the outside air temperature sensor and a predicted outside air temperature at the second time predicted by the first weather forecast is equal to or larger than a predetermined value, i) acquire a second weather forecast, ii) predict a second outside air temperature profile indicating a temporal change in the outside air temperature after the second time based on the second weather forecast, iii) estimate a second temperature adjustment power profile indicating a temporal change in the temperature adjustment power after the second time based on the second outside air temperature profile, and iv) estimate a second charging completion time based on the second temperature adjustment power profile and the estimated suppliable power profile, the second charging completion time being a time at which a value obtained by subtracting a time integral of the second temperature adjustment power profile after the second time from a time integral of the suppliable power profile after the second time is greater than a second threshold, the second threshold being equal to the power amount required to raise the state of charge of the on-board battery to the predetermined value, wherein the predetermined value is larger than zero, and wherein the estimated completion time deriver is configured to estimate the suppliable power profile based on a base profile and an upper limit value of electric power consumable in the building, the base profile indicating a predicted temporal change in a power consumption of loads other than the charger located in the building.

7. The vehicle according to claim 6, wherein the estimated completion time deriver starts estimating the first charging completion time and reports the estimated first charging completion time when supply of the electric power from the charger to the vehicle becomes ready, and wherein the estimated completion time corrector reports the second charging completion time when the estimated completion time corrector estimates the second charging completion time.

8. The vehicle according to claim 6, wherein the base profile includes information corresponding to a temporal change in typical power consumption on a 24-hour basis in a region and in a month, the region including the building, the month including the first time.

9. The vehicle according to claim 8, wherein the base profile is determined by an electric-power company providing electricity to the building.

10. The vehicle according to claim 9, wherein the estimated completion time corrector is configured to receive the base profile via the charger.

11. A charging system comprising circuitry configured to:
control a heater to maintain a temperature of an on-board battery to be equal to or higher than a predetermined temperature, the heater being supplied with temperature adjustment power out of electric power supplied from a charger outside a vehicle, the charger being located in a building;
charge the on-board battery with charging power excluding the temperature adjustment power from the electric power supplied from the charger to the vehicle;
acquire a first weather forecast at a first time;
in response to acquiring the first weather forecast, predict a first outside air temperature profile, the first outside air temperature profile indicating a temporal change in an outside air temperature after the first time based on the first weather forecast;
estimate a first temperature adjustment power profile based on the first outside air temperature profile, the first temperature adjustment power profile indicating a temporal change in the temperature adjustment power after the first time;
estimate a suppliable power profile indicating a temporal change in a maximum supply power of the charger after the first time;
estimate a first charging completion time based on the first temperature adjustment power profile and the suppliable power profile, the first charging completion time being a time at which a value obtained by subtracting a time integral of the first temperature adjustment power profile after the first time from a time integral of the suppliable power profile after the first time is greater than a first threshold, the first threshold being equal to a power amount required to raise a state of charge of the on-board battery to a predetermined value;
detect the outside air temperature; and
when an absolute value of a difference between an actual outside air temperature at a second time after the first time detected by an outside air temperature sensor and a predicted outside air temperature at the second time predicted by the first weather forecast is equal to or larger than a predetermined value, i) acquire a second weather forecast, ii) predict a second outside air temperature profile indicating a temporal change in the outside air temperature after the second time based on the second weather forecast, iii) estimate a second temperature adjustment power profile indicating a temporal change in the temperature adjustment power after the second time based on the second outside air temperature profile, and iv) estimate a second charging completion time based on the second temperature adjustment power profile and the estimated suppliable power profile, the second charging completion time being a time at which a value obtained by subtracting a time integral of the second temperature adjustment power profile after the second time from a time integral of the suppliable power profile after the second time is greater than a second threshold, the second threshold being equal to the power amount required to raise the state of charge of the on-board battery to the predetermined value,
wherein the predetermined value is larger than zero, and
wherein the circuitry is configured to estimate the suppliable power profile based on a base profile and an upper limit value of electric power consumable in the building, the base profile indicating a predicted temporal change in a power consumption of loads other than the charger located in the building.

12. The charging system according to claim 11, wherein the circuitry is configured to start estimating the first charging completion time and report the estimated first charging completion time when supply of the electric power from the charger to the vehicle becomes ready, and
wherein the circuitry is configured to report the second charging completion time when the circuitry estimates the second charging completion time.

13. The charging system according to claim 11, wherein the base profile includes information corresponding to a temporal change in typical power consumption on a 24-hour basis in a region and in a month, the region including the building, the month including the first time.

14. The charging system according to claim 13, wherein the base profile is determined by an electric-power company providing electricity to the building.

15. The charging system according to claim 14, wherein the circuitry is configured to receive the base profile via the charger.

* * * * *